Aug. 4, 1964  J. F. RAMPE  3,142,997

MOLDED PLASTIC PULLEY WITH HEAT CONDUCTING METAL LINING

Filed Nov. 27, 1961

INVENTOR:
JOHN F. RAMPE
BY Bosworth, Sessions
Herestrom and Knowles
ATTORNEYS

United States Patent Office 3,142,997
Patented Aug. 4, 1964

3,142,997
MOLDED PLASTIC PULLEY WITH HEAT CONDUCTING METAL LINING
John F. Rampe, 3417 Fairfax Road,
Cleveland Heights, Ohio
Filed Nov. 27, 1961, Ser. No. 155,035
4 Claims. (Cl. 74—230.17)

This invention relates to pulleys and sheaves made of materials having relatively low heat conductivity, especially those which are formed as by molding synthetic plastic materials.

Molded plastic pulleys are commonly of the adjustable diameter type such as described in my copending application for United States patent, Serial No. 772,309, filed November 6, 1958 now Patent 3,010,333, dated November 28, 1961, for Variable Pitch Sheave; such pulleys are employed in power transmission systems wherein the driving force or forces between pulleys is or are carried by one or more V-belts. Engagement between pulley and belt occurs along the side faces of the belt which are convergent inwardly or toward the rotational axis of the pulley at the same angle as the engaged friction surfaces of the pulley. Slipping and working of the belt not only wears a plastic pulley more quickly than a pulley of steel, aluminum or other metal, but the belt action referred to generates heat which objectionably raises the temperature of the plastic material comprising the pulley. Wear and deterioration of the pulley faces, particularly under conditions of continuous service or at the higher power rates for which any given pulley would otherwise be satisfactory, may become so severe as to result in failure of the pulley, burning of the belt, or both pulley failure and belt burning.

It is therefore the principal object of the invention to provide a molded plastic pulley or sheave, or a pulley or sheave having molded plastic belt engaging components, which is capable of operating continuously under relatively heavy power loading without objectionable heating, deterioration or wear of its belt engaging surfaces.

Another object is to provide an adjustable diameter pulley of the type comprising a pair of companion driving member or flanges one or each of which includes the combination of a molded plastic body and, mechanically interlocked with the body, a metal liner or facing element disposed for direct frictional engagement with a V-belt trained about the pulley; more particularly the invention is concerned with such a pulley in which the liner is annular, of sheet metal and has inner and outer peripheries each interfitted with or embedded in the plastic body of the pulley member.

According to a preferred version the liner has peripheral flange means, inner flange means angularly disposed relative to the main part of the liner and embedded in the plastic body and outer flange means which embraces the periphery of the disc portion of the pulley body. The outer flange holds the sheet metal liner and the plastic disc in intimate association to provide a strong driving connection between the parts and also constitutes a protecting and reinforcing sheath armoring the softer plastic disc periphery against physical damage. In a more particularized arrangement the inner and outer peripheries of the liner element comprise flanges which are circular and concentric to one another; one of the flanges, preferably the inner, is frusto-conical in shape to resist axial separation from the plastic body; the other of the flange is the outer flange it provides an inwardly directed channel that receives the outer periphery of the disc portion of the plastic body.

Other objects and advantages relate to certain novel structural features and combinations and arrangements of parts as set forth in the following detailed description of a preferred embodiment representing the best known mode of practicing the invention. This description is made with reference to the accompanying drawings forming a part of the specification.

Figure 1:
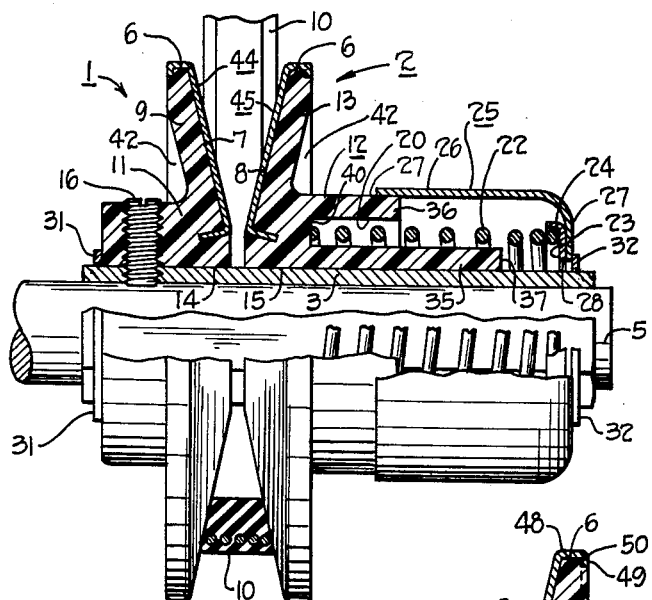
FIG. 1 is an elevational view showing the device of the present invention mounted on the fragmentary end portion of a shaft; this view is partly in section and has parts broken away and removed to show the internal structure.
Figure 4:
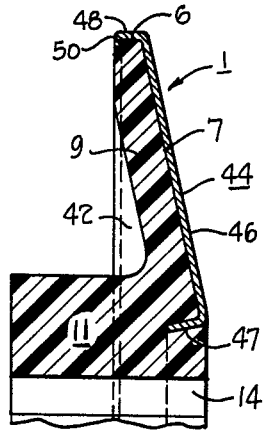
FIG. 4 is an enlarged radial sectional detail of the left hand disc or body member of the device of FIG. 1.
Figure 3:
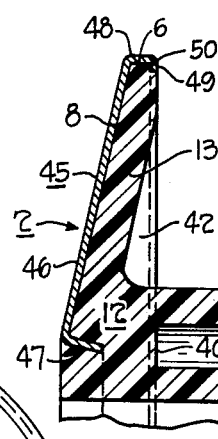
FIG. 3 is an enlarged radial sectional detail of the right hand disc or body member of the device of FIG. 1.

The invention is illustrated in a device which comprises a pair of body members 1, 2 made as by injection or other molding of suitable material such as any of the well-known plastics of which structural shapes are formed. A suitable material is a condensation product of adipic acid and hexamethylene diamine such as nylon; such material, preferably reinforced as by glass fibers, has desirable characteristics of strength, rigidity and wear resistance. Other plastics may be used, such as polystyrene, desirably high impact polystyrene having compounded with it a small percentage of GRS or similar rubber which imparts resiliency and toughness, or plastics such as polypropylene, polyvinylchloride and their combinations. The body member 2 is slidable smoothly on a thin walled mounting sleeve 3 of steel or other suitable metal. This sleeve is of suitable non-circular external shape, is of uniform section from end to end and has a through bore of cylindrical shape to receive shaft 5 on which the device is mounted.

The body members 1, 2 have disc means or portions 9, 13, respectively, each with a circular periphery 6 concentric to the rotational axis of the device. The disc portions are formed with confronting tapered or frusto-conical surfaces 7, 8 adapted to receive and support friction plates, sheaths or liners 44, 45 later described. The liners engage the sides of a drive member in the form of an endless V-belt or A-belt 10 of conventional type.

Hub means or portions 11, 12 of the body members 1, 2, respectively, are of relatively heavy section and are formed with axial through openings 14, 15 that are non-circular in section, the body openings being complemental to the external shape of the mounting sleeve 3 so as to establish a non-rotative or splined connection between each plastic body member and such sleeve. Molded on the outer faces of the body members 1, 2 are reinforcing rib 42 which, at their inner ends, are joined to and integral with the hubs 11, 12.

A driving connection is established between the sheave device and the mounting shaft 5 by set screw means comprising one or more set screws 16 threaded radially through the thick sectioned plastic hub 11 of the body member 1, the set screw means extending through a hole in the mounting sleeve 3 and being engaged directly against the cylindrical surface of the shaft 5. The hub 11 and the sleeve 3 are formed with registered radial openings having internal threads that match the set screw threads so that the set screw is threadedly engaged in both the hub and the sleeve.

The thick sectioned hub 12 of the body member 2 is formed with an annular channel or groove 20 concentric to the rotational axis of the device. This groove opens through the end of the hub which faces away from the body member 1 having the set screw means and receives one end of a helical coil compression spring 22 which seats against groove bottom 40 and serves to bias the body members 1, 2 toward one another. A reaction ring 23 of stamped metal is received about the mounting sleeve 3 in spaced relation beyond the end of the hub 12 and provides a seat for the outer end of the coil spring 22, locating the latter by an axially directed curved section flange 24.

A dust excluding cover or cap in the form of a stamped metal cup 25 is received about the outer end of the hub 12, the spring 22, the reaction ring 24 and the sleeve 3. This cup has a cylindrical portion 26 that embraces and has telescopic sliding engagement with outwardly facing cylindrical surface 27 of the hub. The dust cup 25 has a bottom portion 27 formed with a central aperture 28 so as to be received over and located in concentric relation to the mounting sleeve 3.

Figure 2:
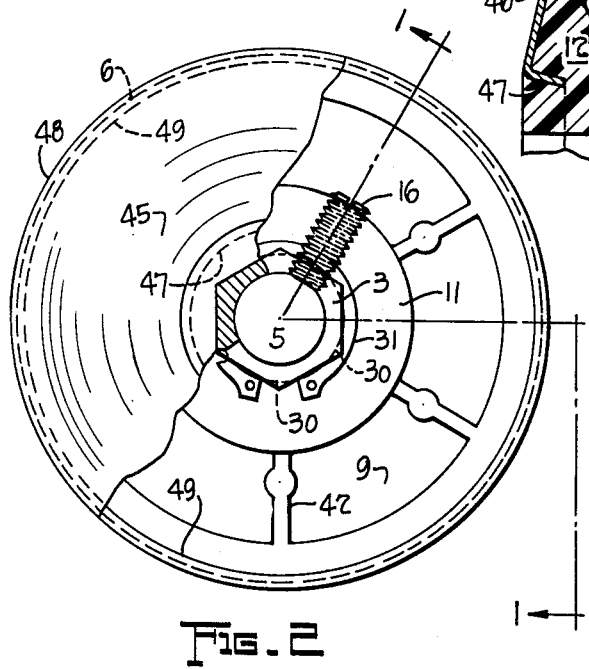
FIG. 2 is an elevational view with parts broken away and removed of the left end of the device of FIG. 1.

Adjacent its ends the mounting sleeve 3 is formed across its hex corners with external grooves 30 (FIG. 2) into which spring metal retaining rings 31, 32 are snap fitted. In projecting radially beyond the outside surfaces of the mounting sleeve, the snap rings 31, 32 constitute abutments between which are confined all those components of the device that are mounted on the sleeve 3.

The annular groove 20 in the hub 12 separates a relatively long inner hub portion 35 from a relatively short outer hub portion 36. The inner portion 35 embraces and is guided on the mounting sleeve 3 for axial sliding movement. Outer end face 37 of the hub inner portion 35 is engageable with the reaction ring 23 to limit the sliding movement of the body member 2 on the mounting sleeve.

The sheet metal lining or facing elements 44, 45 are spun to shape or preferably are formed as stampings; they may be, and for reasons of economy preferably are, identical as shown. Each facing comprises an annular or ring shaped frusto-conical belt engaging portion 46 received snugly against the complemental frusto-conical surface of the body member on which it is mounted, being the surfaces 7, 8 of the body members 1, 2. Each facing has a circular inner periphery and, concentric thereto, an outer periphery, both peripheries being concentric to the rotational axis of the pulley.

At its inner periphery each facing is formed with angularly disposed flange means which may be serrated or perforated to provide a strong mechanical interlock with the plastic body of the pulley member or, as shown, may comprise an annular flange 47 of uniform section throughout its circumferential extent. This inner flange means is thus frusto-conical in shape, its transverse or radial elements being normal to the intersecting radial elements of the belt engaging portion 46 and disposed along lines which are oblique to and intersect the rotational axis of the assembly. The non-cylindrical shape of the inner flange 47 and its being embedded in the hub means wholly within the axial projection of the juncture between the disc means and the hub means interlocks it in and against axial withdrawal from the plastic body of the pulley part in which it is embedded in the molding operation.

The outer periphery of each metallic facing 44, 45 is formed with an integral flange 48 suitably interlocked with the outer periphery 6 of the disc portion of the pulley body member on which the facing is mounted. A preferred interlock is achieved by making the peripheral flange 48 with a reverse bend so that a marginal edge portion 49 is located behind the plastic disc. Thus the periphery of each of the sheet metal facings takes the form of a U-shaped inwardly opening channel which receives the circular periphery 6 of the plastic disc. A rabbet 50 is provided on the plastic disc to receive the reversely bent lip 49 of the facing or liner, the lip being cast in place or spun over.

The embedment of the inner flange 47 and the interlock of the outer flange 48 with concentric, radially spaced portions of the plastic body retain the metal facing in intimate association with the plastic material of which the body is formed, preventing slippage and relative motion. In this connection it is to be observed that the inner flange 47 of the metal facing on the pulley member 2 is of less diameter than the cylindrical surface 27 of the hub 12, and the inner flange of the metal facing on the pulley member 1 is of less diameter than the corresponding cylindrical surface of the hub 11. Thus the inner flanges of the metal facings are embedded in the relatively thick sectioned hub portions of the plastic body members. Reinforcement of the thinner disc portions 9, 13 of the plastic bodies is thus provided and the driving torque is transmitted directly between the metal facings and the thick sectioned plastic hubs. The outer peripheral reversely bent integral metal flanges 48 of the facings 44, 45 strengthen and reinforce the pulley discs against occasional heavy loads to which they may be subjected in use. They particularly protect the peripheries of the pulley parts; they resist impacts and concentrated loads; they resist lateral deflection of the discs.

In operation the flexible V-belt 10 engages only a fractional portion of each of the sheet metal facings 44, 45. Heat generated in the working of the belt and in its frictional engagement with the surfaces of the sheet metal facings is conducted away from the areas of contact and distributed over the much larger (several times greater) areas of the exposed surfaces of the facings from which the heat is given up by radiation to the environment of the pulley and by convection in the ambient air contacting the exposed surfaces of the metal facings. Excessive localized heating of the working faces of the pulley is thus avoided, hot spots are eliminated and burning and deterioration of the plastic pulley parts and of the flexible belt 10 is minimized.

The present invention thus provides a sheave or pulley of combined metal and molded plastic parts adapted to be quickly and inexpensively produced.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In a variable diameter sheave assembly for use in power transmission by a flexible V-belt,
   a pair of companion drive members for receiving between them and engaging the opposite sides of a V-belt,
   each drive member comprising hub means and radial disc means, said assembly including means for mounting said members on a shaft with their disc means confronting for rotation in unison about a common axis and for relative axial movement toward and away from one another in changing the effective diameter at which a given belt is engaged by the assembly,
   at least one of said members comprising a one piece molded plastic body in which the disc means thereof projects radially outwardly from the hub means and has an outer periphery concentric to said axis,
   a liner of sheat metal having high heat conductivity relative to the plastic body on and wholly supported by the latter,
   said liner having an outer periphery at the periphery of the disc means and an inner periphery comprising flange means including elements lying along lines which are oblique to and intersect said axis,
   said oblique elements of the inner periphery having a mechanical interlock with the plastic body securing the liner to the plastic body and preventing axial separation,
   said liner having a conical friction surface disposed in spaced confronting relation to the companion drive member for direct engagement by a belt received between the members, and the radial extent of the liner surface being several times greater than the radial extent of the area of engagement between the liner and a belt engaged between the drive members for radial transmission by conductivity and dissipation of heat generated at the liner surface by said engagement.

2. In a sheave assembly as defined in claim 1, the disc means and the hub means of the plastic body having a juncture which surrounds the axis of the assembly and the connection of the oblique elements of the liner inner periphery to the plastic body being disposed wholly within the axial projection of said juncture.

3. In a sheave assembly as defined in claim 1, the oblique elements of the liner inner periphery being embedded in the hub portion of the plastic body.

4. In a variable diameter sheave assembly for use in power transmission by a flexible V-belt, a pair of companion drive members for receiving between them and engaging the opposite side of a V-belt, each drive member comprising hub means and radial disc means, said assembly including means for mounting said members on a shaft with their disc means confronting for rotation in unison about a common axis and for relative axial movement toward and away from one another in changing the effective diameter at which a given belt is engaged by the assembly, at least one of said members comprising a one piece molded plastic body in which the disc means thereof projects radially outwardly from the hub means and has an outer periphery concentric to said axis, a liner of sheet metal having high heat conductivity relative to the plastic body on and wholly supported by the latter, said liner comprising a substantially frusto-conical belt engaging portion and inner and outer peripheral portions, the inner portion comprising flange means having elements angularly disposed relative to the belt engaging portion and extending into and embedded in the plastic body in interlocking relation anchoring said inner portion against axial displacement relative to the plastic body, said flange means elements extending along lines which are oblique to and intersect said axis, the outer portion comprising flange means providing a channel, the periphery of the disc being received in said channel and protectively enclosed by said outer peripheral flange means, the belt engaging portion of said liner having a conical friction surface disposed in spaced confronting relation to the companion drive member for direct engagement by a belt received between the members, and the radial extent of the liner surface being several times greater than the radial extent of the area of engagement between the liner and a belt engaged between the drive members for radial transmission by conductivity and dissipation of heat generated at the liner surface by said engagement.

References Cited in the file of this patent

UNITED STATES PATENTS

| | | |
|---|---|---|
| 2,321,438 | Tyler | June 8, 1943 |
| 2,545,327 | Williams | Mar. 13, 1951 |
| 2,586,567 | Scheele | Feb. 19, 1952 |
| 3,010,333 | Rampe | Nov. 28, 1961 |
| 3,076,352 | Larsh | Feb. 5, 1963 |

FOREIGN PATENTS

| | | |
|---|---|---|
| 481,163 | Italy | May 23, 1953 |

UNITED STATES PATENT OFFICE
CERTIFICATE OF CORRECTION

Patent No. 3,142,997                      August 4, 1964

John F. Rampe

It is hereby certified that error appears in the above numbered patent requiring correction and that the said Letters Patent should read as corrected below.

Column 1, line 44, for "member" read -- members --; line 67, strike out "flange" and insert instead -- flanges is formed with a reverse bend and when such other flange --; column 2, line 53, for "rib" read -- ribs --; column 5, line 21, for "side" read -- sides --.

Signed and sealed this 29th day of June 1965.

(SEAL)
Attest:

ERNEST W. SWIDER
Attesting Officer

EDWARD J. BRENNER
Commissioner of Patents